(12) United States Patent
Kadu

(10) Patent No.: US 11,683,261 B2
(45) Date of Patent: *Jun. 20, 2023

(54) LOAD-AWARE ECMP WITH FLOW TABLES

(71) Applicant: Avago Technologies International Sales Pte. Limited, Singapore (SG)

(72) Inventor: Sachin Prabhakarrao Kadu, Fremont, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/538,910

(22) Filed: Nov. 30, 2021

(65) Prior Publication Data

US 2022/0337511 A1 Oct. 20, 2022

Related U.S. Application Data

(63) Continuation of application No. 17/230,940, filed on Apr. 14, 2021, now Pat. No. 11,323,358.

(51) Int. Cl.
*H04L 45/24* (2022.01)
*H04L 45/02* (2022.01)
*H04L 45/00* (2022.01)
*H04L 45/42* (2022.01)
*H04L 47/125* (2022.01)

(52) U.S. Cl.
CPC .............. *H04L 45/24* (2013.01); *H04L 45/02* (2013.01); *H04L 45/20* (2013.01); *H04L 45/42* (2013.01); *H04L 47/125* (2013.01)

(58) Field of Classification Search
CPC ......... H04L 45/02; H04L 45/20; H04L 45/24; H04L 45/42; H04L 47/125
See application file for complete search history.

(56) References Cited

U.S. PATENT DOCUMENTS

| | | | |
|---|---|---|---|
| 9,049,137 B1 | 6/2015 | Markine | |
| 10,102,168 B2 | 10/2018 | Anubolu | |
| 10,778,588 B1 | 9/2020 | Singh | |
| 2014/0293786 A1 | 10/2014 | Lin et al. | |
| 2015/0312134 A1 | 10/2015 | Kapadia | |
| 2016/0050150 A1 | 2/2016 | Venkatesan | |
| 2020/0044984 A1 | 2/2020 | Huynh | |
| 2021/0160173 A1 | 5/2021 | Biradar | |

FOREIGN PATENT DOCUMENTS

CN 105245447 8/2018

OTHER PUBLICATIONS

Extended European Search Report from European Patent Application No. 22154051.1, dated Jul. 4, 2022, 8 pages.
Katta, et al., "Clove: Congestion-Aware Load Balancing at the Virtual Edge," Proceedings of the 13th International Conference on Emerging Networking Experiments and Technolgies, Nov. 2017, 13 pages.

*Primary Examiner* — George C Neurauter, Jr.
(74) *Attorney, Agent, or Firm* — Foley & Lardner LLP

(57) ABSTRACT

A semiconductor chip for implementing load-aware equal-cost multipath routing includes a number of ports and several pipes, each pipe being coupled to a portion of ports on the semiconductor chip, and a central unit consisting of a state machine and multiple databases. The databases contain information regarding a communication network including an overlay network and an underlay network, and the state machine is implemented in hardware and can determine at least one feature of the overlay network and a corresponding group of paths within the underlay network.

20 Claims, 8 Drawing Sheets

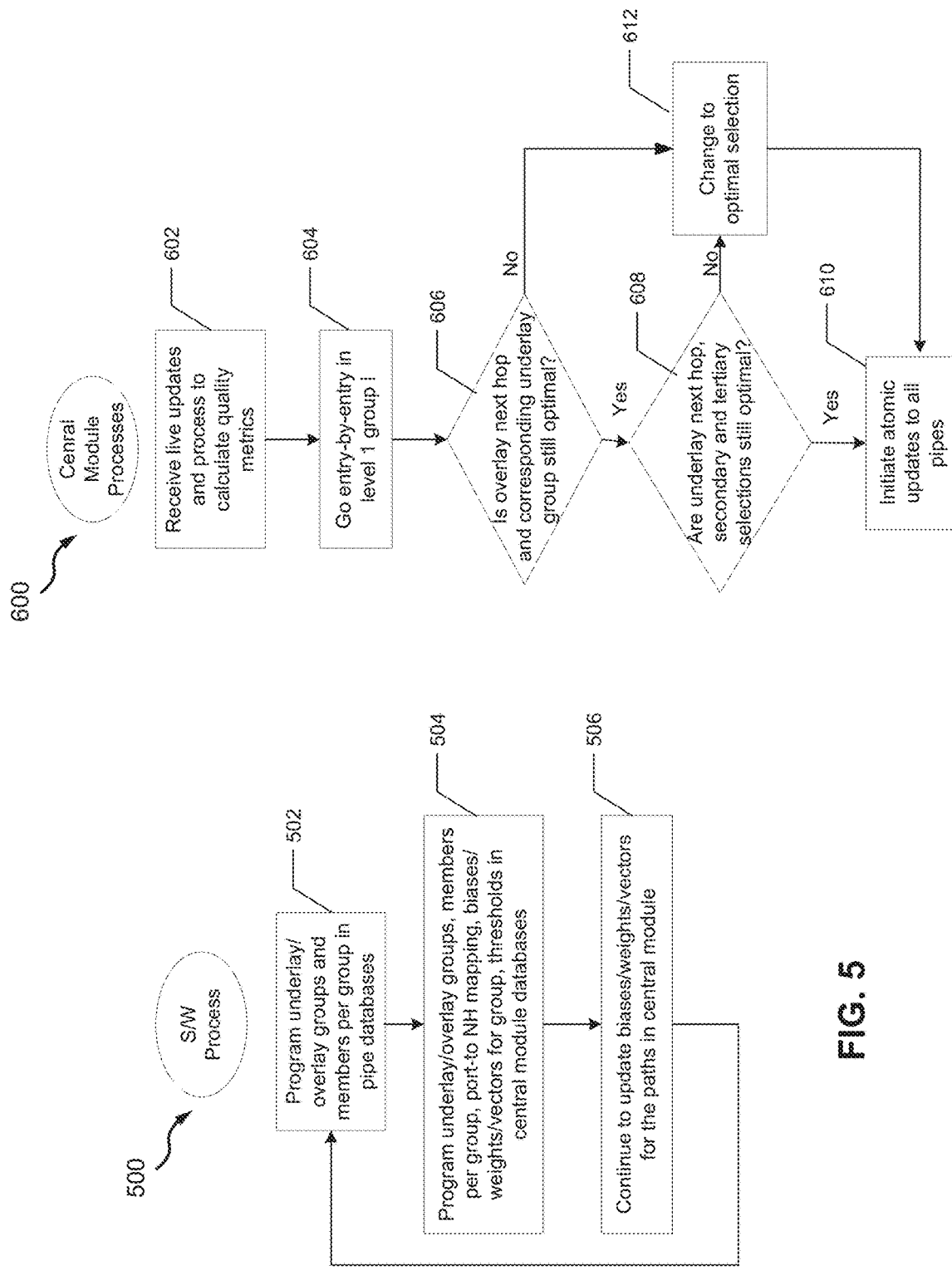

LOAD-AWARE ECMP WITH FLOW TABLES

CROSS REFERENCE TO PRIOR APPLICATIONS

The present application is a continuation-in-part of the U.S. patent application Ser. No. 17/230,940, filed on Apr. 14, 2021, which is incorporated by reference herein in its entirety.

TECHNICAL FIELD

The present description relates generally to Ethernet communication and, in particular, to load-aware, equal-cost multipath (ECMP) routing implementation with flow tables.

BACKGROUND

Equal-cost multipath (ECMP) routing is a routing strategy where packet forwarding to a single destination can occur over multiple best paths with equal routing priority. Multipath routing can be used in conjunction with most routing protocols because it is a per-hop decision made independently at each router. It can substantially increase bandwidth by load-balancing traffic over multiple paths; however, there may be significant limitation in deploying it in practice. For example, the ECMP route selection is essentially fixed to a flow-hash % ECMP-group-size, which returns the same result on different network nodes. The hash algorithms are usually not perfect; for instance, there can be biases and the distribution can be nonuniform. The more important problem with ECMP is that the concept of checking for instantaneous loading or congestion, while selecting a path, does not exist. Paths are fixed based on the flow-hash and statistically preprogrammed. Even when one tries to program desired paths by software (S/W), there is a severe limitation of response time and there is no mechanism for the reordering of packets, which renders it practically useless.

BRIEF DESCRIPTION OF THE DRAWINGS

Certain features of the subject technology are set forth in the appended claims. However, for purposes of explanation, several embodiments of the subject technology are set forth in the following figures.

FIG. 5 is a flow diagram illustrating an example of a software (S/W) process, in accordance with some aspects of the subject technology.

FIG. 6 is a flow diagram illustrating an example of a central module process, in accordance with some aspects of the subject technology.

DETAILED DESCRIPTION

Figure 1:
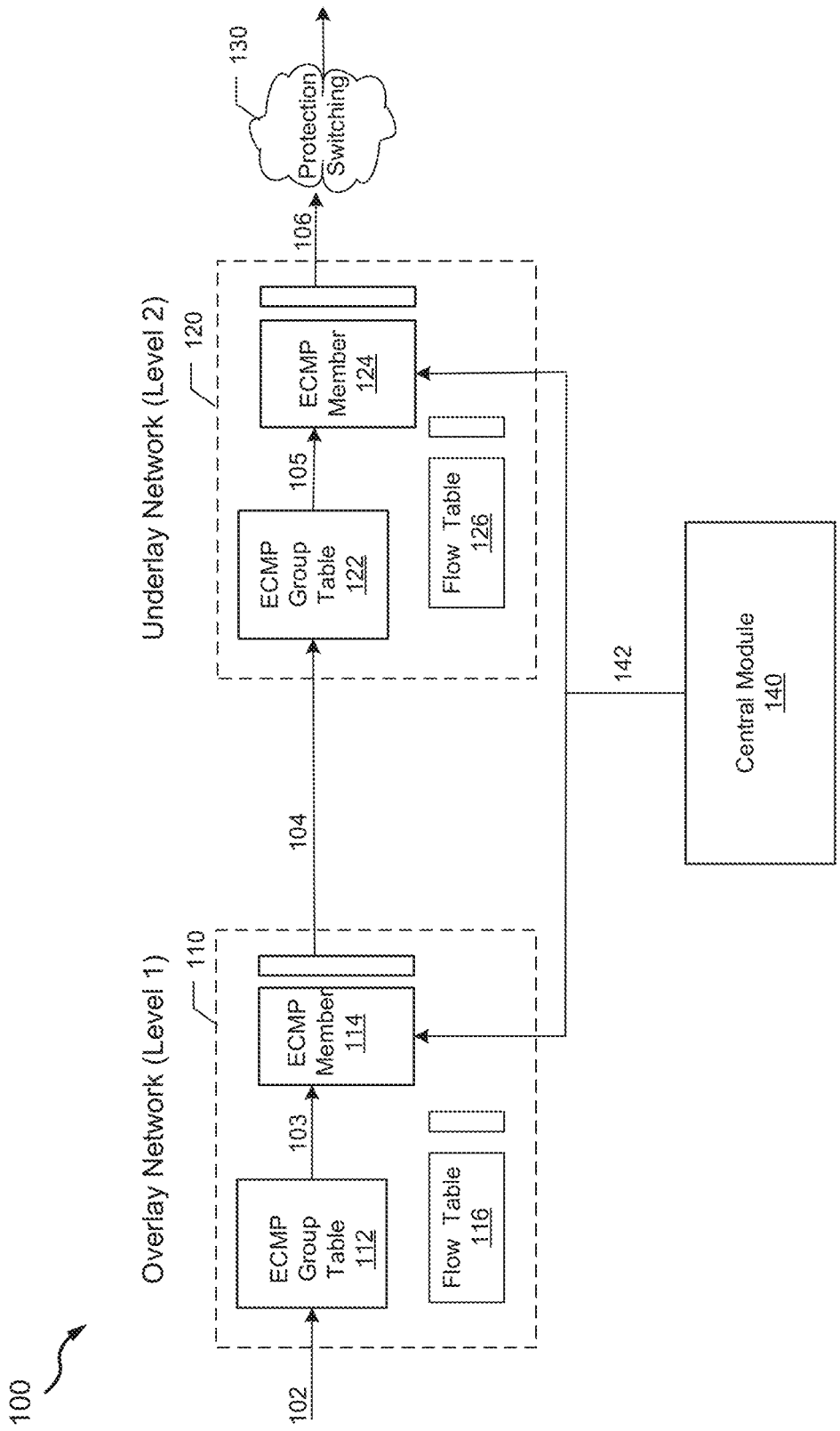
FIG. 1 is a block diagram illustrating an example of an abstract view for one pipe of a load-aware, equal-cost multipath (ECMP) routing system, according to various aspects of the subject technology.

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to methods and systems for load-aware equal-cost multipath (ECMP) routing implementation with flow tables. The disclosed ECMP technique helps with improving network performance factors such as lowering network congestion and latencies that are effective in minimizing packet loss. In the existing solutions, the ECMP groups and corresponding members are programmed statically, and there is no consideration of dynamic network situations such as instantaneous loading/congestion on ports or corresponding queues and the up/down state of ports and/or links indicated by the next-hop index. If the output ports are found to be down in a given router, then protection-switching logic provides preprogrammed alternatives, secondary and (if secondary is also down, then) tertiary choices, without any knowledge of dynamic congestion/loading on those alternative ports. The entire table structure may require reprogramming to address ports that went down, which might require a significant amount of time for detection and then correction by software (S/W).

The load-aware ECMP technique of the subject technology makes the entire ECMP infrastructure dynamically load balanced, with comparatively very small chip area and/or power cost. The load-aware ECMP also helps to reduce congestion in the networks and significantly reduce the tail latencies. Biases, weights and/or vectors can help take into account parameters affecting further hops in the underlay and overlay networks for desired path selection, which can dramatically improve the network performance. An overlay network (overlay) is a virtual network that is built on top of an underlying network infrastructure and/or network layer (the underlay network or underlay). The existing solution needs to update the entire undelay and overlay programming in response to a dynamic network situation, which is very time consuming and disruptive to the entire network. The same desired selection is also applied to secondary and tertiary protection-switching logic alternatives to avoid congestion on those links in case of down ports, avoiding network bottlenecks.

In the load-aware ECMP technique of the subject technology, the lowest amount of information is replicated per pipe (e.g., a data-communication pipe between two nodes), as there is no need to have bias/weight/vector programming inside the pipes, and also no need of port/queue quality metrics in every pipe. All programming and port/queue quality metrics are performed by the central module (only one copy for the entire chip), saving significant area, power and cost for chips with higher bandwidth, and hence more pipes. The load-aware ECMP solution has a fraction of the area, power, latency and cost of any other per pipe dynamic load-balancing solutions. This is because the path selection is not done locally per packet in the pipes, but centrally by a single state machine for all the pipes; an expensive time-stamp mechanism is not required to avoid reordering; it supports dynamic desired selection for overlay as well, based on corresponding biases/weights/vectors, without any packet reordering; it supports not only per-port, but per-port per-queue, quality metrics, which improves selection granularity to lowest possible; and it dramatically improves accuracy of the selection of desired port/queue and significantly expands the scope of applications for this load balancing. The disclosed central state machine is implemented in hardware, which is significantly faster and more favorable, compared to traditional implementation in S/W, for any exceptions handling, updates for down ports/links, and protection switching.

FIG. 1 is a block diagram illustrating an example of an abstract view for a pipe 100 of a load-aware ECMP, according to various aspects of the subject technology. The abstract view shows the pipe 100 of the load-aware ECMP routing including a level 1, overlay network 110; a level 2, underlay network 120; a protection-switching logic 130; and a central module (also referred to as a central unit) 140. The overlay network 110 includes an ECMP group table 112, an ECMP member table 114 and a flow table 116. The underlay network 120 includes an ECMP group table 122, an ECMP member table 124 and a flow table 126. The ECMP group table 112 receives a level 1 group-index 102 from forwarding lookup of a packet or from an access control list and generates group properties 103. The group in the context of the present disclosure is a collection of paths with given characteristics. For example, from a source location (e.g., San Jose) to a destination (e.g., New York) there may be a number of (e.g., 10) paths. The group properties 103 is passed to an ECMP member of the ECMP member table 114. The index of the ECMP member is given by a group base value (group_base) provided by the ECMP group table 112+a group size as a hash value calculated based on packet characteristics (hash % group_size). The ECMP group table 122 receives an overlay next-hop 104 from the ECMP member tables 114 and generates group properties 105. The group properties 105 is forwarded to an ECMP member of the ECMP member table 124. The index of the ECMP member is given by group_base+hash % group_size. The output of the ECMP member table 124 is passed through a protection-switching logic 130 for the underlay next hop (NH) to reach an NH table to derive outgoing properties of the packet. The NH refers to the closet router/switch in the network that a packet can go through.

The central module 140 is coupled to all pipes on a given chip and implements many important features of the subject technology. The central module 140 remedies the shortcomings of the existing ECMP solutions discussed above. The central module 140 includes databases for level 1 (overlay) and level 2 (underlay) group tables (e.g., ECMP group tables 112 and 124) and corresponding members (e.g., ECMP member tables 114 and 124), NH to ports mapping, overlay NH's to underlay groups mapping, and dynamic port status. In the central module 140 there are also databases for any biases, weights and/or vectors for paths beyond the current hop and thresholds, as well as instantaneous loading and congestion information for port and queues per port. The state machine in the central module 140 goes entry-by-entry of level 1 group and/or member and level 2 group, and processes the loading, bias and port status info to pick a desired NH and/or group per entry to be populated in the level 1 and/or level 2 member table. The desired NH and/or group at any level is the one that has less loading compared to other NH's and/or groups. Because the state machine has complete information about the device ports per NH, loading and/or congestion on each of those ports, as well as information about the faraway ports (on different devices) through the biases, it can determine which are the least loaded NH and/or group. The central module 140 provides periodic updates 142 to the overlay network 110 and the underlay network 120. When the hit bit corresponding to an index is 1, it is set to 0 and the member table does not get updated. When the hit bit is 0, the member table is updated with desired NH and/or group. The programmed inactivity periods of the central module 140 decide the update frequency.

The flow tables 116 and 126 are provided by the subject technology for finer-grained control, in conjunction with the controls described above. The level 1 and level 2 group tables (e.g., ECMP group tables 112 and 124) can be enabled to use the flow tables 116 and 126, respectively. The flow tables 116 and 126 can record the flow using the hash calculated on the flow variables (e.g., 5 tuple) and corresponding chosen desired link at the same time of populating the new flow table. The flow tables 116 and 126 can record any number of flows per group and are only limited by the flow table scales. The flows do not change the desired selection, unless minimum inactivity periods on the earlier selection are reached, using the same hit bit mechanism described herein. This will avoid packet reordering and disruptions to the network. Configurable overrides for this behavior are also provided. If the flows remain inactive for the programmed time period (no packets received for the flow, for that time period), the flows will be aged out (deleted from the flow table) to reduce the flow table scale requirements.

Figure 2:
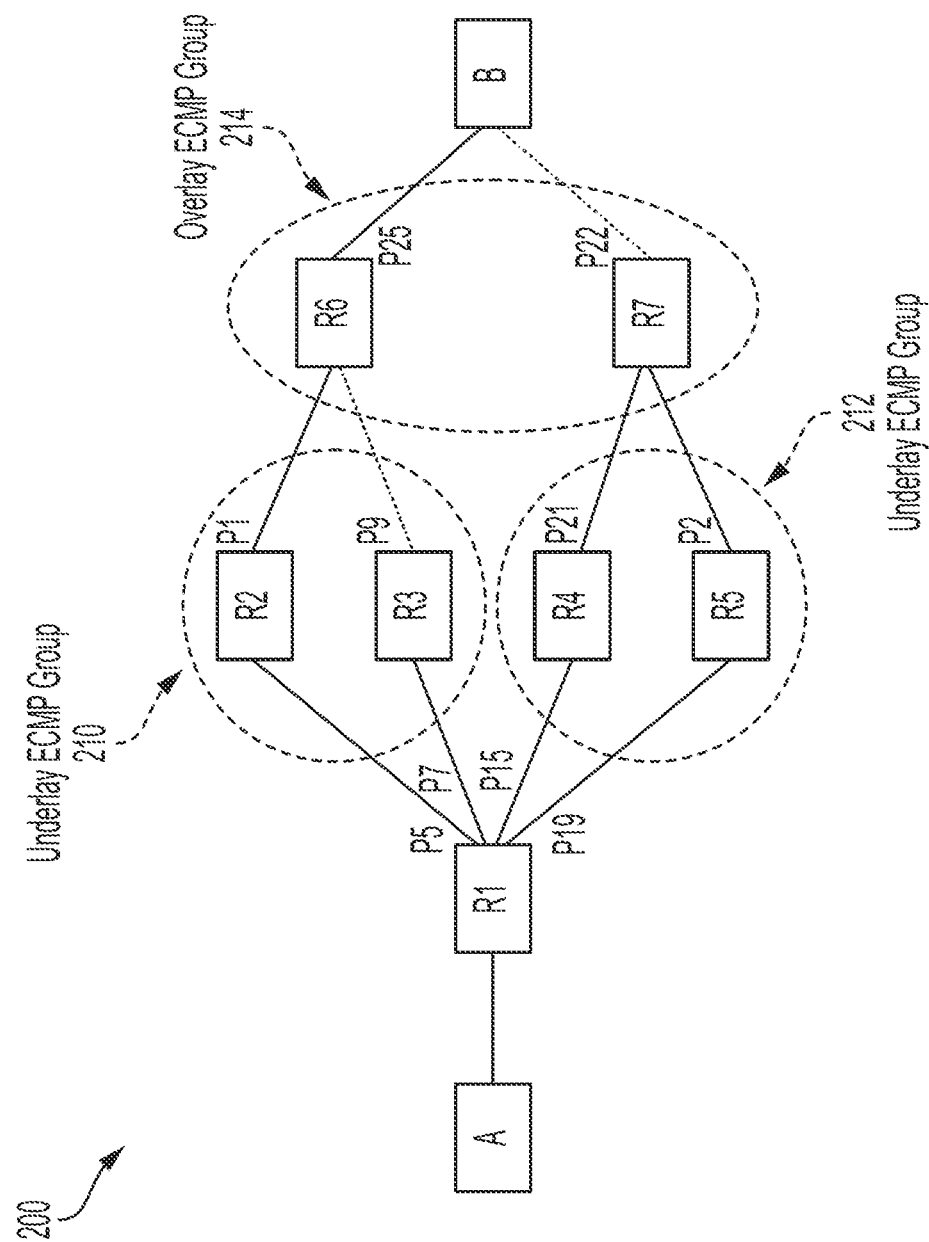
FIG. 2 is a block diagram illustrating an example of dynamically evaluated mapping for desired paths of an ECMP, according to various aspects of the subject technology.

FIG. 2 is a block diagram illustrating an example of dynamically evaluated mapping 200 for desired paths of a load-aware ECMP, according to various aspects of the subject technology. In the dynamically evaluated mapping 200, a first host A is connected to a first router R1, which in turn is connected through paths (links) P5, P7, P15 and P19 to routers R2 and R3 of an underlay ECMP group 210 and routers R4 and R5 of an underlay ECMP group 212. The routers R2 and R3 are connected through paths P1 and P9 to a router R6 of an overlay ECMP group 214, and the routers R4 and R5 are connected through paths P21 and P2 to a router R7 of the overlay ECMP group 214. The routers R6 and R7 are connected via paths P25 and P22 to a second host B.

Routers have info on port and/or queue loading on their own ports only. The quality of links beyond the current hops need to be programmed as biases/weights/vectors in group tables. For example, when the links (paths) P9 and P22 are facing congestion instantaneously, for example, due to bandwidth limitation, the router R1 may or may not see the resultant loading and/or congestion on its port P7 and corresponding queues, however the bias against the R3-to-R6 link (P9) needs to be programmed in an underlay group table (e.g., 122 of FIG. 1) and also bias against R7-to-B (P22) has to be programmed in an overlay group table (e.g., 112 of FIG. 1). To take care of this situation, the central state machine of the central module 140 of FIG. 1 can pick R6 for overlay and R2 for underlay as being desired at the time. When eventually R7-to-B link (P22) clears up, the state machine picks R7 as overlay as a desired choice at that time.

However, the hit bit mechanism will make sure updates to pipe tables will wait for a programmed minimum inactivity period on an earlier selection. This, in turn, makes sure that all the packets sent on that path in the given pipe and given flow are always ahead of the packets to be sent on the new updated path, avoiding the undesired reordering of the packets.

To make sure there is no packet reordering when the desired port selection changes for a given packet-flow, there exists a programmable minimum inactivity period before the change is actually updated into member tables in the pipes. The central state machine sets the hit bit corresponding to an entry of 0, and if there was no packet hitting the entry, then the hit bit is set to 1 when the state machine returns to read it again after the specific period. The minimum inactivity period is to let all the previous packets, from the same flow and using the previous path always, be ahead of the packets that will see the updated path. The minimum inactivity for a given member entry is enforced as follows. There is a hit bit maintained per entry of the level 2 member table that is set to 1 when the entry is referenced by a packet. This bit is checked at the time of periodic state machine updates to the member table. If the checked hit bit is 1, it is set to 0 and no update is made to the entry. If the hit bit is 0, the update is made to the entry. If the update rate of the state machine per entry is corresponding to the programmed minimum activity period, that period will automatically be enforced for a minimum inactivity check.

Figure 3A:
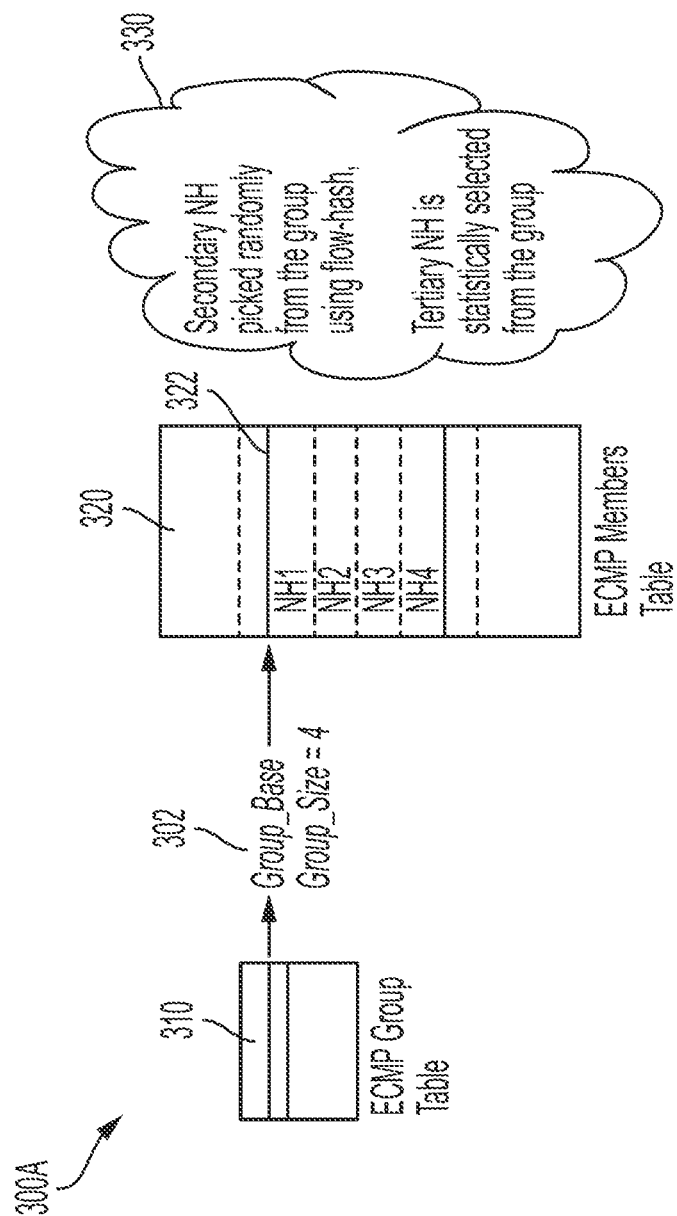
FIGS. 3A and 3B are block diagrams illustrating examples of static ECMP mapping and load-aware dynamic ECMP mapping to be read by packets, according to various aspects of the subject technology.
Figure 3B:
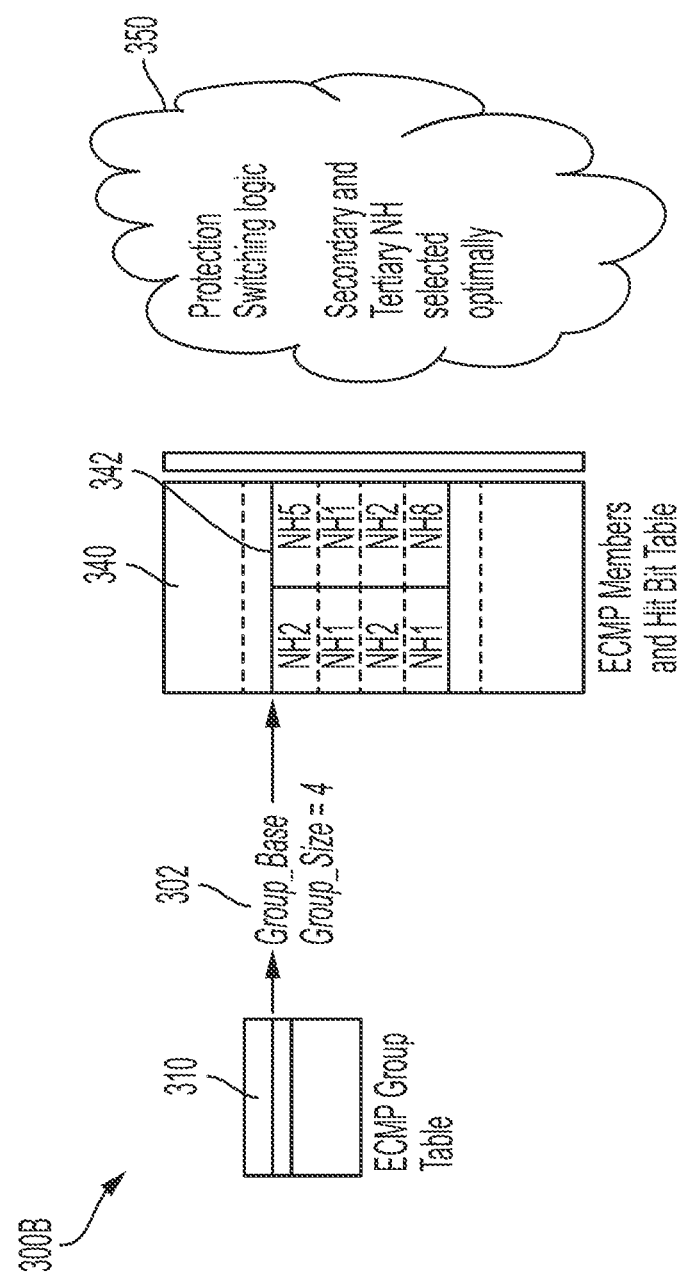

FIGS. 3A and 3B are block diagrams illustrating examples of static ECMP mapping in a pipe 300A and load-aware dynamic ECMP mapping in a pipe 300B, according to various aspects of the subject technology. The static ECMP mapping is performed in pipe databases of the pipe 300A to be read by packets. As shown in FIG. 3A, the ECMP group table 310 provides group base and size information 302 to the ECMP members table 320. The size information 302 identifies a group base 322 and a group size of 4, which includes NHs NH1, NH2, NH3 and NH4. In the pipe 300A, all the applicable members are preprogrammed. In the protection switching logic 330, secondary NH is picked randomly from the group using a flow-hash, and the tertiary NH is statically selected from the group.

The dynamic ECMP mapping of the subject technology is performed in pipe databases of the pipe 300B to be read by packets. As shown in FIG. 3B, the ECMP group table 310 similarly provides group base and size information 302 to the ECMP members and hit bit table 340. The size information 302 identifies a group base 342 and a group size of 4. The desired selection can be expanded to the lowest granularity of per-queue-per-port. In the example of two queues per port, the group base 342 includes a first desired selection (NH2, NH1, NH2 and NH1) and second desired selection (NH5, NH1, NH2 and NH8) per entry. The central state machine considers the instantaneous loading on the ports and/or queues corresponding to NH, any biases/weights/vectors programmed for accounting into parameters beyond this hop, before selecting the desired NH per entry as well as secondary and tertiary NH. The protection switching logic 350 can select the desired secondary and tertiary NH. The first desired selection is for incoming packets having a class of service 0 and the second desired selection is for incoming packets having a class of service 1.

Figure 4:
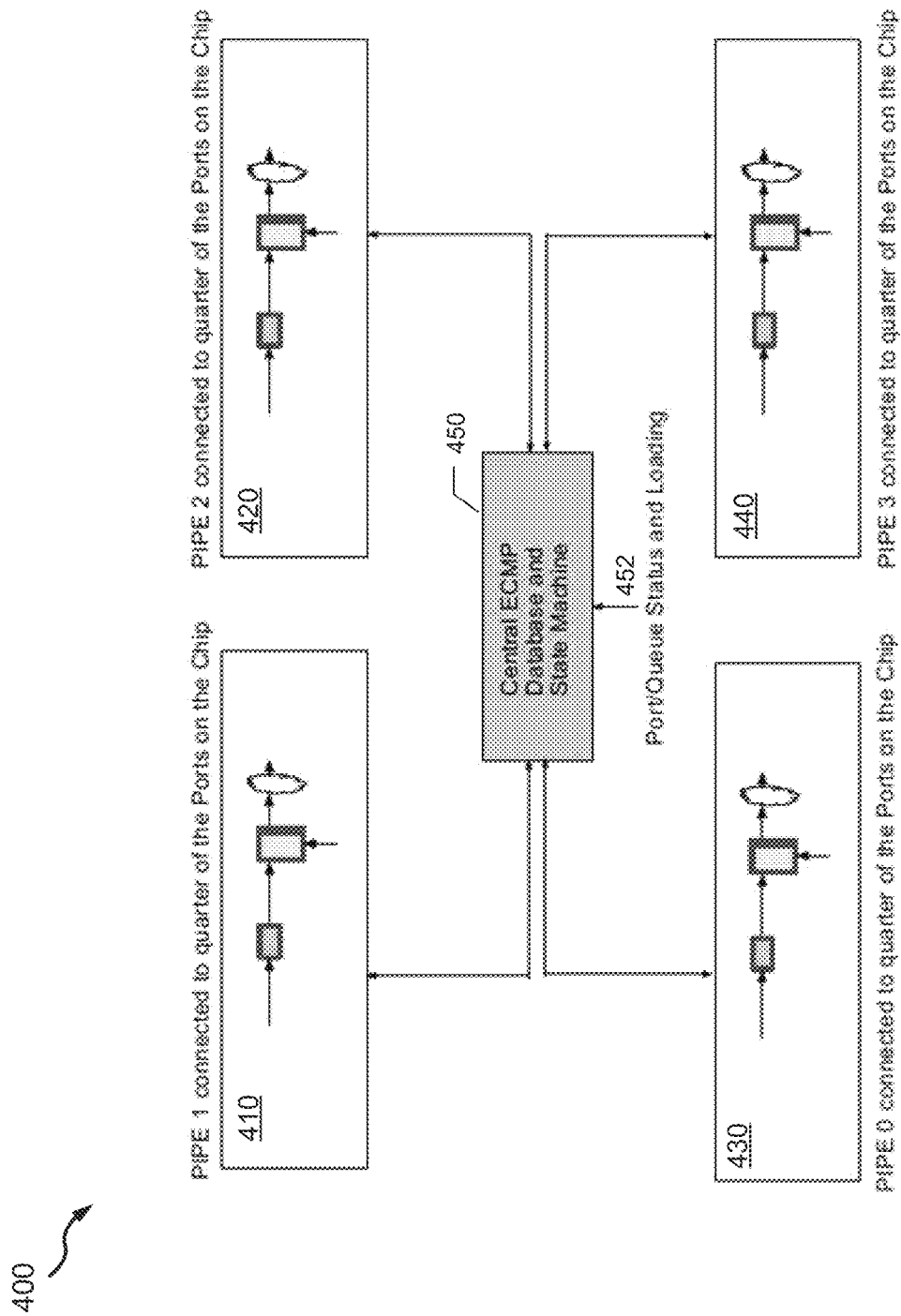
FIG. 4 is a schematic diagram illustrating an example of a per-chip view for load-aware ECMP, in accordance with some aspects of the subject technology.

FIG. 4 is a schematic diagram illustrating an example of a per-chip view 400 for load-aware ECMP, in accordance with some aspects of the subject technology. The per-chip view 400 shows four pipes including pipe 410 (pipe 1), pipe 420 (pipe 2), pipe 430 (pipe 0) and pipe 440 (pipe 3). Each of the pipes 410, 420, 430 and 440 are connected to one quarter of the ports on the chip. A central ECMP database and state machine 450 receives ports status and loading information 452 and is in communication with the pipes 410, 420, 430 and 440 to provide periodic updates to the ECMP members (e.g., 114 of FIG. 1) of the pipes 410, 420, 430 and 440, as discussed above with respect to FIG. 1. The load-aware desired paths of the subject disclosure are set up by the state machine 450 in advance, instead of packets choosing the paths one by one. Further, the disclosed scheme takes care of minimum programmed inactivity periods on a given path before updating it to the new one, to avoid undesired reordering of packets. These features are among the differentiating aspects of the subject technology that enable a centralized and aggregated implementation (without any further cost) for the entire chip. These differentiating aspects also support other advantageous feature described above, for example, using a fraction of the area, power, latency and cost of any other per pipe dynamic load-balancing solutions, or being faster and more favorable compared to the traditional S/W implementations due to the use of the state machine 450.

FIG. 5 is a flow diagram illustrating an example of a S/W process 500, in accordance with some aspects of the subject technology. The S/W process 500 starts at operation block 502, where the S/W programs underlay and/or overlay group tables (e.g., 122 and 112 of FIG. 1) and members per group (e.g., 124 and 114 of FIG. 1) in the pipe database. At operation block 504, the S/W programs underlay and/or overlay group tables and members per group, port-to-NH mapping, biases, weights and/or vectors for the group and thresholds in the central module databases. At operation block 506, the S/W continues updating biases, weights and/or vectors for the paths in the central module (e.g., 140 of FIG. 1). At this point, the control of the S/W process 500 is passed to the operation block 502 for the process to continue.

FIG. 6 is a flow diagram illustrating an example of a central module process 600, in accordance with some aspects of the subject technology. The central module process 600 starts at operation block 602, where the central module receives live updates and process to calculate quality metrics. At operation block 604, the central module goes entry by entry in level 1 group 1, and at control operation block 606, the central module checks whether overlay NH and the corresponding underlay group are still favorable. If the answer is yes, at control operation block 608, the central module continues to check whether the underlay NH and secondary and tertiary selections are still favorable. If the answer to the checking in the control operation block 606 is no, at operation block 612 the desired selection is changed, and control is passed to operation block 610. If at the at control operation block 608, the underlay NH and secondary and tertiary selections are favorable, the control is passed to operation block 610, where an atomic update to all pipes is initiated.

Figure 7:
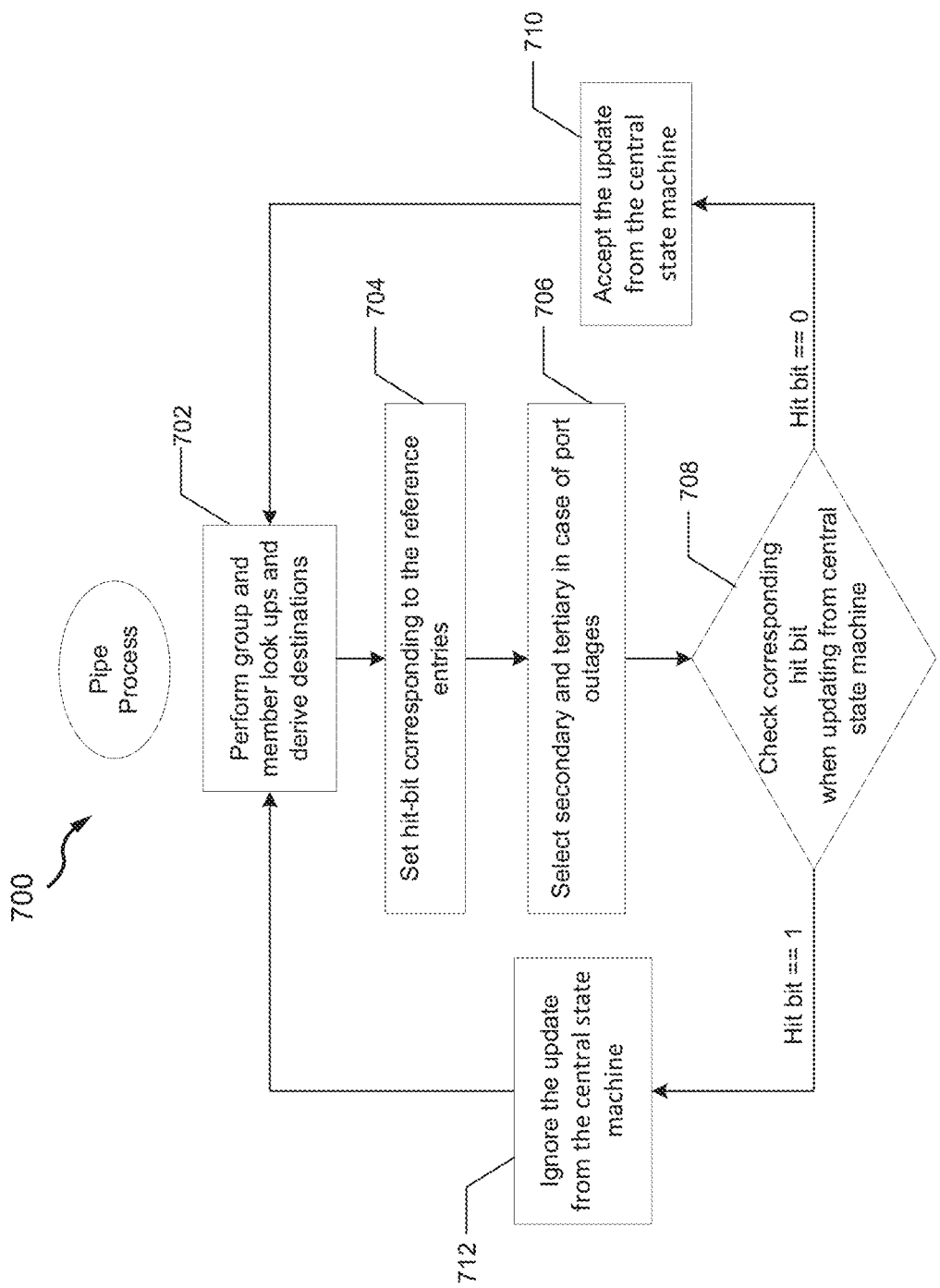
FIG. 7 is a flow diagram illustrating an example of a pipe process, in accordance with some aspects of the subject technology.

FIG. 7 is a flow diagram illustrating an example of a pipe process 700, in accordance with some aspects of the subject technology. The pipe process starts at operation block 702, where the pipe processor performs group and member look ups and derives destinations, as is normally done in ECMP. At operation block 704, the pipe processor sets hit bit corresponding to the reference entries, and at operation block 706, selects secondary and tertiary options in case of a port outage. At control operation block 708, the pipe processor checks the corresponding hit bit when updating from the central state machine. If the hit bit is equal to zero, at operation block 710 the update from the central state machine is accepted and the control is passed to operation block 702. If the hit bit is equal to 1, at operation block 712, the update from the central state machine is ignored and the control is passed to operation block 702.

Figure 8:
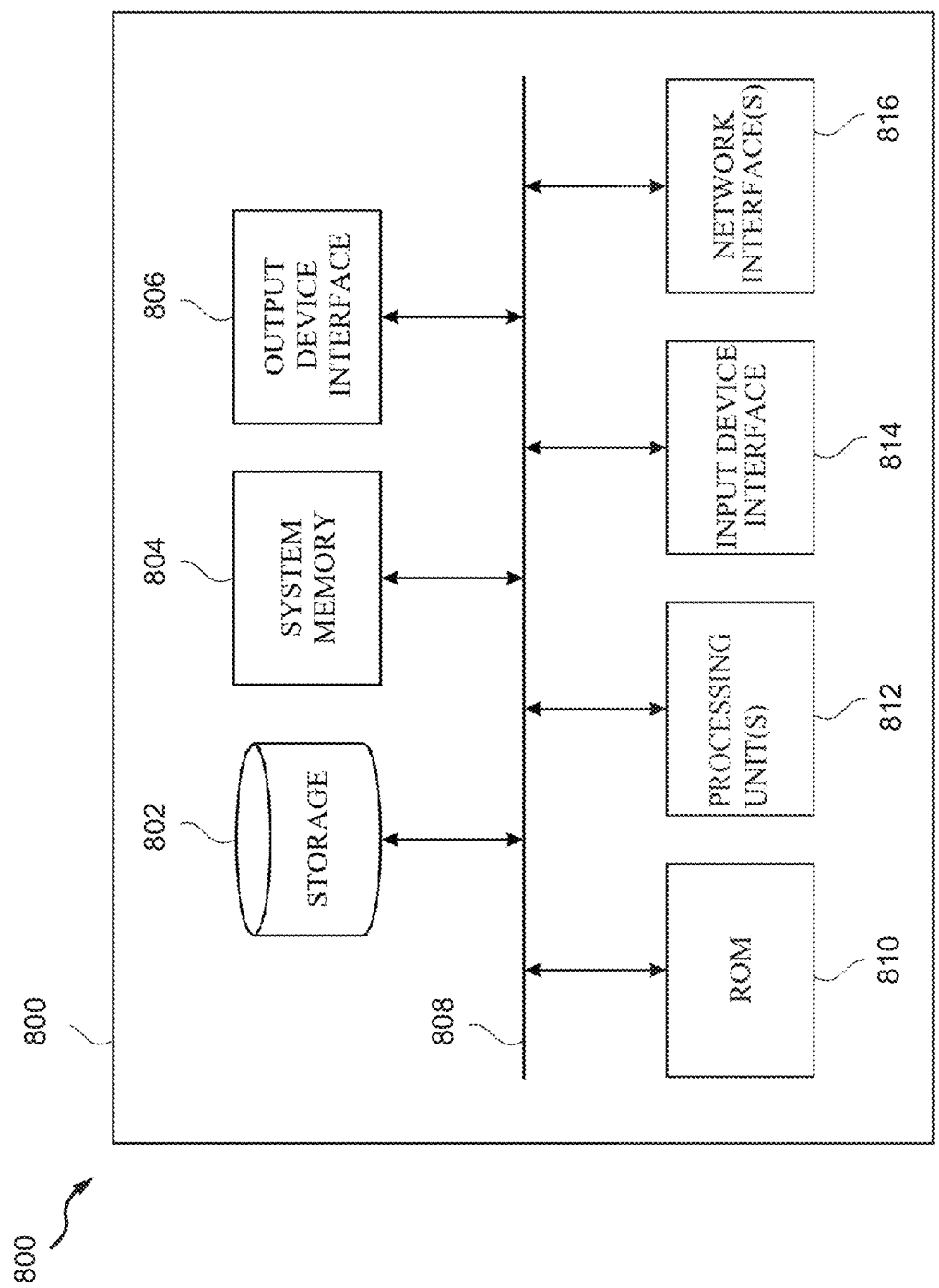
FIG. 8 is an electronic system within which some aspects of the subject technology are implemented.

FIG. 8 is an electronic system 800 within which some aspects of the subject technology are implemented. The electronic system 800 can be, and/or can be a part of, the network switch of a data center or an enterprise network. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations. In one or more aspects, the one or more processing unit(s) 812 may be used to implement the processes of FIGS. 5, 6 and/or 7.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random-access memory (RAM). The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, through the one or more network interface(s) 816. In this manner, the electronic system 800 can be a part of a network of computers (such as a local area network (LAN), a wide area network (WAN), an Intranet, or a network of networks, such as the Internet). Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as "an aspect," "the aspect," "another aspect," "some aspects," "one or more aspects," "an implementation," "the implementation," "another implementation," "some implementations," "one or more implementations," "an embodiment," "the embodiment," "another embodiment," "some embodiments," "one or more embodiments," "a configuration," "the configuration," "another configuration," "some configurations," "one or more configurations," "the subject technology," "the disclosure," "the present disclosure," and other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A semiconductor chip for implementing load-aware equal-cost multipath (ECMP), the semiconductor chip comprising:
   a plurality of ports;
   a plurality of pipes, each pipe being coupled to a portion of the plurality of ports; and
   a central unit comprising a state machine and a plurality of databases, wherein:
the plurality of databases are configured to contain information regarding a communication network including an overlay network and an underlay network, and
the state machine is configured to determine at least one feature of the overlay network and a corresponding group of paths within the underlay network to overcome a dynamic network situation.

2. The semiconductor chip of claim 1, wherein the information comprises properties of multiple paths between a first host and a second host.

3. The semiconductor chip of claim 1, wherein the information comprises next hop (NH) to ports mapping information for the overlay network and the underlay network.

4. The semiconductor chip of claim 3, wherein the information comprises overlay NHs to underlay groups mapping information.

5. The semiconductor chip of claim 1, wherein the information comprises dynamic port status and biases, weights and/or vectors for paths beyond a current hop.

6. The semiconductor chip of claim 1, wherein the information comprises thresholds, instantaneous loading and congestion information for the plurality of ports, and queues per port.

7. The semiconductor chip of claim 1, wherein the dynamic network situation comprises a network congestion, and wherein the state machine is configured to check entry by entry of overlay network and underlay network group tables and members tables to determine a desired set of the plurality of ports for a group of paths to reduce the network congestion.

8. The semiconductor chip of claim 7, wherein the state machine is configured to process loading, biases and port status information.

9. The semiconductor chip of claim 7, wherein the state machine is configured to evaluate the desired set of the plurality of ports for a group of paths based on at least one of the following:
local port up/down status,
local instantaneous loading and congestion for the plurality of ports and corresponding queues,
biases, weights and/or vectors on the path beyond a current hop, and
thresholds.

10. The semiconductor chip of claim 7, wherein the state machine is configured to enforce a minimum inactivity period for an entry of a member table by:
setting a hit bit maintained per an entry of members tables of the underlay network to 1 when the entry is referenced by a packet,
checking the hit bit at a time of periodic state machine updates to the members tables and making an update to the entry when a value of the hit bit is 0, and
automatically enforcing a programmed minimum activity period for a minimum inactivity check, when an update rate of the state machine per entry corresponds to a programmed minimum activity period.

11. A method of implementing load-aware ECMP routing, the method comprising:
configuring a plurality of databases to store information regarding a communication network including an overlay network and an underlay network; and
configuring a state machine, implemented in hardware, to determine at least one feature of the overlay network and a corresponding group of paths within the underlay network to overcome a dynamic network situation;
implementing the plurality of databases and the state machine on a semiconductor chip, the semiconductor chip including a plurality of pipes and a plurality of ports; and
coupling each pipe of the plurality of pipes to a portion of the plurality of ports on the semiconductor chip.

12. The method of claim 11, wherein the dynamic network situation comprises a network congestion, and wherein the method further comprises configuring the state machine to check entry by entry of overlay network and underlay network group and members tables and to evaluate a desired set of the plurality of ports for a group of paths to reduce the network congestion.

13. The method of claim 12, further comprising configuring the state machine to setup load-aware desired paths in advance and process loading, biases and port status information.

14. The method of claim 12, further comprising configuring the state machine to evaluate the desired set of the plurality of ports for a group of paths based on at least one of the following:
local port up/down status,
local instantaneous loading and congestion for the plurality of ports and corresponding queues,
biases, weights and/or vectors on a path beyond a current hop, and
thresholds.

15. The method of claim 12, further comprising configuring the state machine to enforce a minimum inactivity period for a given entry of a members table to avoid undesired reordering of packets by:
setting a hit bit maintained per an entry of members tables of the underlay network to 1 when the entry is referenced by a packet,
checking the hit bit at a time of periodic state machine updates to the members table and making an update to the entry when a value of the hit bit is 1, and
automatically enforcing a programmed minimum activity period for a minimum inactivity check, when an updated rate of the state machine per entry corresponds to a programmed minimum activity period.

16. The method of claim 11, wherein the information comprises:
properties of multiple paths between a first host and a second host of a network,
NH to ports mapping for the overlay network and the underlay network,
overlay NHs to underlay groups mapping,
dynamic port status and biases, weights and/or vectors for paths beyond a current hop, and
thresholds, instantaneous loading and congestion information for the plurality of ports and queues per port.

17. A system comprising:
memory;
one or more processors coupled to the memory and configured to execute instructions to perform following acts:
program group tables associated with an overlay network and an underlay network; and
program members per group and port-to-NH mapping.

18. The system of claim 17, wherein the one or more processors are further configured to:
program biases, weights and vectors for group tables and thresholds stored in one or more central databases;
update the biases, the weights and the vectors for paths in a central module; and check whether there are new updates and if there are new updates, cause a state machine to act on latest updates while making sure, by a hit-bit mechanism, not to cause any packet reordering.

19. The system of claim 17, further comprising flow tables configured to record flows using a hash calculated based on flow variables and a corresponding selected link at a time of populating a new flow in the flow tables.

20. The system of claim 19, wherein the flow tables are configured to record a number of flows up to a flow table scale value, and wherein a flow that remains inactive for a programmed period is aged out and deleted from the flow tables to reduce a flow table scale requirement.

* * * * *